United States Patent
Ellison et al.

(10) Patent No.: US 6,760,441 B1
(45) Date of Patent: Jul. 6, 2004

(54) GENERATING A KEY HIEARARCHY FOR USE IN AN ISOLATED EXECUTION ENVIRONMENT

(75) Inventors: Carl M. Ellison, Portland, OR (US); Roger A. Golliver, Beaverton, OR (US); Howard C. Herbert, Phoenix, AZ (US); Derrick C. Lin, Foster City, CA (US); Francis X. McKeen, Portland, OR (US); Gilbert Neiger, Portland, OR (US); Ken Reneris, Wilbraham, MA (US); James A. Sutton, Portland, OR (US); Shreekant S. Thakkar, Portland, OR (US); Millind Mittal, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/539,348

(22) Filed: Mar. 31, 2000

(51) Int. Cl.[7] .................................................. H04L 9/00
(52) U.S. Cl. .......................................... 380/45; 380/44
(58) Field of Search ................................. 380/277, 284, 380/44, 45, 46; 713/187, 189, 166, 200

(56) References Cited

U.S. PATENT DOCUMENTS

| 4,037,214 A | 7/1977 | Birney |
| 4,162,536 A | 7/1979 | Morley |

(List continued on next page.)

FOREIGN PATENT DOCUMENTS

| DE | 4217444 | 12/1992 |
| EP | 0473913 | 3/1992 |
| EP | 0600112 | 8/1994 |
| EP | 0930567 A3 | 4/2000 |
| EP | 1 030 237 A | 8/2000 |
| EP | 1146715 | 10/2001 |
| JP | 2000076139 | 3/2000 |
| WO | WO 97/29567 | 8/1997 |
| WO | WO 98/34365 | 8/1998 |
| WO | WO 9844402 | 10/1998 |
| WO | WO 9905600 | 2/1999 |
| WO | WO9909482 | 2/1999 |
| WO | WO 9957863 | 11/1999 |
| WO | WO 0062232 | 10/2000 |
| WO | WO 01/27723 A | 4/2001 |
| WO | WO 01/27821 A | 4/2001 |
| WO | WO 01/75565 | 10/2001 |
| WO | WO 01/75595 | 10/2001 |
| WO | WO 01/75595 A2 | 10/2001 |
| WO | WO0217555 | 2/2002 |
| WO | WO0175564 | 10/2002 |
| WO | WO02086684 | 10/2002 |

OTHER PUBLICATIONS

Menezes et al.(Handbook of Applied Cryptography, CRC press, 1997, pp. 171–175).*

(List continued on next page.)

Primary Examiner—Kim Vu
Assistant Examiner—Hosuk Song
(74) Attorney, Agent, or Firm—Blakely, Sokoloff, Taylor & Zafman LLP

(57) ABSTRACT

The present invention is a method, apparatus, and system to generate a key hierarchy for use in an isolated execution environment of a protected platform. In order to bind secrets to particular code operating in isolated execution, a key hierarchy comprising a series of symmetric keys for a standard symmetric cipher is utilized. The protected platform includes a processor that is configured in one of a normal execution mode and an isolated execution mode. A key storage stores an initial key that is unique for the platform. A cipher key creator located in the protected platform creates the hierarchy of keys based upon the initial key. The cipher key creator creates a series of symmetric cipher keys to protect the secrets of loaded software code.

32 Claims, 7 Drawing Sheets

U.S. PATENT DOCUMENTS

| | | |
|---|---|---|
| 4,247,905 A | 1/1981 | Yoshida et al. ............. 711/166 |
| 4,276,594 A | 6/1981 | Morley |
| 4,278,837 A | 7/1981 | Best |
| 4,307,214 A | 12/1981 | McDaniel et al. |
| 4,307,447 A | 12/1981 | Provanzano et al. |
| 4,319,323 A | 3/1982 | Ermolovich et al. |
| 4,347,565 A | 8/1982 | Kaneda et al. |
| 4,366,537 A | 12/1982 | Heller et al. |
| 4,521,852 A | 6/1985 | Guttag |
| 4,571,672 A | 2/1986 | Hatada et al. |
| 4,759,064 A | 7/1988 | Chaum |
| 4,795,893 A | 1/1989 | Ugon |
| 4,825,052 A | 4/1989 | Chemin et al. |
| 4,907,270 A | 3/1990 | Hazard |
| 4,907,272 A | 3/1990 | Hazard |
| 4,910,774 A | 3/1990 | Barakat |
| 5,007,082 A | 4/1991 | Cummins |
| 5,022,077 A | 6/1991 | Bealkowski et al. |
| 5,075,842 A | 12/1991 | Lai |
| 5,079,737 A | 1/1992 | Hackbarth |
| 5,139,760 A | 8/1992 | Ogawa et al. |
| 5,255,379 A | 10/1993 | Melo |
| 5,293,424 A | 3/1994 | Holtey et al. |
| 5,317,705 A | 5/1994 | Gannon et al. |
| 5,319,760 A | 6/1994 | Mason et al. |
| 5,386,552 A | 1/1995 | Garney |
| 5,421,006 A | 5/1995 | Jablon et al. |
| 5,434,999 A | 7/1995 | Goire et al. |
| 5,437,033 A | 7/1995 | Inoue et al. |
| 5,442,645 A | 8/1995 | Ugon et al. |
| 5,455,909 A | 10/1995 | Blomgren et al. |
| 5,459,867 A | 10/1995 | Adams et al. |
| 5,459,869 A | 10/1995 | Spilo |
| 5,473,692 A | 12/1995 | Davis |
| 5,479,509 A | 12/1995 | Ugon |
| 5,504,922 A | 4/1996 | Seki et al. |
| 5,511,217 A | 4/1996 | Nakajima et al. |
| 5,522,075 A | 5/1996 | Robinson et al. |
| 5,528,231 A | 6/1996 | Patarin |
| 5,533,126 A | 7/1996 | Hazard et al. |
| 5,566,323 A | 10/1996 | Ugon |
| 5,568,552 A | 10/1996 | Davis |
| 5,606,617 A | 2/1997 | Brands |
| 5,615,263 A | 3/1997 | Takahashi |
| 5,628,022 A | 5/1997 | Ueno et al. |
| 5,657,445 A | 8/1997 | Pearce |
| 5,717,903 A | 2/1998 | Bonola |
| 5,720,609 A | 2/1998 | Pfefferle |
| 5,721,222 A | 2/1998 | Bernstein et al. |
| 5,729,760 A | 3/1998 | Poisner |
| 5,737,604 A | 4/1998 | Miller et al. |
| 5,737,760 A | 4/1998 | Grimmer |
| 5,757,919 A | 5/1998 | Herbert |
| 5,764,969 A | 6/1998 | Kahle et al. |
| 5,796,835 A | 8/1998 | Saada |
| 5,796,845 A | 8/1998 | Serikawa et al. |
| 5,805,712 A | 9/1998 | Davis |
| 5,825,875 A | 10/1998 | Ugon |
| 5,835,594 A | 11/1998 | Albrecht et al. |
| 5,844,986 A | 12/1998 | Davis |
| 5,852,717 A | 12/1998 | Bhide |
| 5,854,913 A | 12/1998 | Goetz et al. |
| 5,867,577 A | 2/1999 | Patarin |
| 5,872,994 A | 2/1999 | Akiyama et al. |
| 5,890,189 A | 3/1999 | Nozue et al. |
| 5,900,606 A | 5/1999 | Rigal |
| 5,901,225 A | 5/1999 | Ireton et al. |
| 5,903,752 A | 5/1999 | Dingwall et al. |
| 5,937,063 A | 8/1999 | Davis |
| 5,953,502 A | 9/1999 | Helbig, Sr. |
| 5,970,147 A | 10/1999 | Davis et al. |
| 5,978,481 A | 11/1999 | Ganesan et al. |
| 5,987,557 A | 11/1999 | Ebrahim |
| 6,014,745 A | 1/2000 | Ashe |
| 6,055,637 A | 4/2000 | Hudson et al. |
| 6,058,478 A | 5/2000 | Davis |
| 6,061,794 A | 5/2000 | Angelo |
| 6,075,938 A | 6/2000 | Bugnion et al. |
| 6,085,296 A | 7/2000 | Karkhanis et al. |
| 6,092,095 A | 7/2000 | Maytal |
| 6,101,584 A | 8/2000 | Satou et al. |
| 6,115,816 A | 9/2000 | Davis |
| 6,125,430 A | 9/2000 | Noel et al. |
| 6,148,379 A | 11/2000 | Schimmel |
| 6,158,546 A | 12/2000 | Hanson et al. |
| 6,175,925 B1 | 1/2001 | Nardone et al. |
| 6,178,509 B1 | 1/2001 | Nardone et al. |
| 6,182,089 B1 | 1/2001 | Ganapathy et al. |
| 6,192,455 B1 | 2/2001 | Bogin et al. |
| 6,205,550 B1 | 3/2001 | Nardone et al. |
| 6,212,635 B1 | 4/2001 | Reardon |
| 6,222,923 B1 * | 4/2001 | Schwenk ..................... 380/44 |
| 6,249,872 B1 | 6/2001 | Wildgrube et al. |
| 6,252,650 B1 | 6/2001 | Nakaumra |
| 6,269,392 B1 | 7/2001 | Cotichini et al. |
| 6,272,533 B1 | 8/2001 | Brown |
| 6,272,637 B1 | 8/2001 | Little et al. |
| 6,282,651 B1 | 8/2001 | Ashe |
| 6,282,657 B1 | 8/2001 | Kaplan et al. |
| 6,292,874 B1 | 9/2001 | Barnett |
| 6,301,646 B1 | 10/2001 | Hostetter |
| 6,308,270 B1 | 10/2001 | Guthery et al. |
| 6,314,409 B2 | 11/2001 | Schneck et al. |
| 6,321,314 B1 | 11/2001 | Van Dyke |
| 6,330,670 B1 | 12/2001 | England et al. |
| 6,339,815 B1 | 1/2002 | Feng |
| 6,339,816 B1 | 1/2002 | Bausch |
| 6,357,004 B1 | 3/2002 | Davis |
| 6,363,485 B1 | 3/2002 | Adams |
| 6,374,286 B1 | 4/2002 | Gee et al. |
| 6,374,317 B1 | 4/2002 | Ajanovic et al. |
| 6,378,072 B1 * | 4/2002 | Collins et al. ............. 713/187 |
| 6,389,537 B1 | 5/2002 | Davis et al. |
| 6,397,242 B1 | 5/2002 | Devine et al. |
| 6,412,035 B1 | 6/2002 | Webber |
| 6,421,702 B1 | 7/2002 | Gulick |
| 6,435,416 B1 | 8/2002 | Slassi |
| 6,445,797 B1 * | 9/2002 | McGough ................... 380/285 |
| 6,557,104 B2 * | 9/2002 | Vu et al. .................... 713/189 |
| 6,463,535 B1 | 10/2002 | Drews et al. |
| 6,463,537 B1 | 10/2002 | Tello |
| 6,499,123 B1 | 12/2002 | McFarlane et al. |
| 6,505,279 B1 | 1/2003 | Phillips et al. |
| 6,507,904 B1 | 1/2003 | Ellison et al. |
| 6,535,988 B1 | 3/2003 | Poisner |
| 6,633,963 B1 | 10/2003 | Ellison et al. |
| 6,633,981 B1 | 10/2003 | Davis |
| 2001/0021969 A1 | 9/2001 | Burger et al. |
| 2001/0027527 A1 | 10/2001 | Balashov et al. |
| 2001/0037450 A1 | 11/2001 | Metlitski et al. |

OTHER PUBLICATIONS

Brands, Stefan, "Restrictive Blinding of Secret–Key Certificates", Springer–Verlag XP002201306, (1995),Chapter 3.

Chien, Andrew A., et al., "Safe and Protected Execution for the Morph/AMRM Reconfigurable Processor", *7th Annual IEEE Symposium, FCCM '99 Proceedings*, XP010359180, ISBN 0–7695–0375–6, Los Alamitos, CA, (Apr. 21, 1999), 209–221.

Compaq Computer Corporation, et al., "Trusted Computing Platform Alliance (TCPA) Main Specification Version 1.1a", (Dec. 2001), 1–321.

Davida, George I., et al., "Defending Systems Against Viruses through Cryptographic Authentication", *Proceedings of the Symposium on Security and Privacy*, IEEE Comp. Soc. Press, ISBN 0–8186–1939–2, (May 1989).

IBM, "Information Display Technique for a Terminate Stay Resident Program IBM Technical Disclosure Bulletin", *TDB–ACC–No. NA9112156*, vol. 34, Issue 7A, (Dec. 1, 1991), 156–158.

Karger, Paul A., et al., "A VMM Security Kernal for the VAX Architecture", *Proceedings of the Symposium on Research in Security and Privacy*, XP010020182, ISBN 0–8186–2060–9, Boxborough, MA, ( May 7, 1990),2–19.

Kashiwagi, Kazuhiko , et al., "Design and Implementation of Dynamically Reconstructing System Software", *Software Engineering Conference*, Proceedings 1996 Asia–Pacific Seoul, South Korea Dec. 4–7, 1996, Los Alamitos, CA USA, IEEE Comput. Soc, US, ISBN 0–8186–7638–8,(1996).

Luke, Jahn, et al., "Replacement Strategy for Aging Avionics Computers", *IEEE AES Systems Magazine*, XP002190614,(Mar. 1999).

Menezes, Oorschot, "Handbook of Applied Cryptography", *CRC Press LLC*, USA XP002201307, (1997),475.

Richt, Stefan, et al., "In–Circuit–Emulator Wird Echtzeittauglich", *Elektronic*, Franzis Verlag GMBH, Munchen, DE, vol. 40, No. 16, XP000259620,(100–103),Aug. 6, 1991.

Robin, John S., et al., "Analysis of the Pentium's Ability to Support a Secure Virtual Machine Monitor", *Proceedings of the 9th USENIX Security Symposium*, XP002247347, Denver, Colorado, (Aug. 14, 2000),1–17.

Saez, Sergio , et al., "A Hardware Scheduler for Complex Real–Time Systems", *Proceedings of the IEEE International Symposium on Industrial Electronics*, XP002190615, (Jul. 1999),43–48.

Sherwood, Timothy , et al., "Patchable Instruction ROM Architecture", *Department of Computer Science and Engineering*, University of California, San Diego, La Jolla, CA, (Nov. 2001).

J. Heinrich: "MIPS R4000 Microprocessor User's Manual," Apr. 1, 1993, MIPS, Mt. View, XP002184449, pp. 61–97.

Goldberg, R., "Survey of virtual machine research," IEEE Computer Magazine 7(6), pp. 34–45, 1974.

Gum, P.H., "System/370 Extended Architecture: Facilities for Virtual Machines," IBM J. Research Development, vol. 27, No. 6, pp. 530–544, Nov. 1983.

Rosenblum, M. "Vmware's Virtual Platform: A Virtual Machine Monitor for Commodity PCs," Proceedings of the 11th Hotchips Conference, pp. 185–196, Aug. 1999.

Lawton, K., "Running Multiple Operating Systems Concurrently on an IA32 PC Using Virtualization Techniques," http://www.plex86.org/research/paper.txt; Nov. 29, 1999; pp. 1–31.

"M68040 User's Manual", 1993, Motorola Inc., p. 1–5–p. 1–9, p. 1–13–p. 1–20, p.2–1–p. 2–3, p. 4–1, p. 8–9–p. 8–11.

"Intel 386 DX Microprocessor 32–BIT CHMOS Microprocessor with Integrated Memory Management", Dec. 31, 1995, Intel Inc., p. 32–56; figure 4–14.

Joe Heinrich:"MIPS R4000 Microprocessor User's Manual", 1994, MIPS Technology Inc., Mountain View, CA, pp. 67–79.

Berg C: "How Do I Create a Signed Applet?", Dr. Dobb's Journal, M&T Publ., Redwood City, CA, US, vol. 22, No. 8, 8 '97, p. 109–111, 122.

Gong L et al: "Going Beyond the Sandbox: An Overview of the New Security Architecture in the Java Development Kit 1.2", Proceedings of the Usenix Symposium on Internet Technologies and Systems, Montery, CA 12 '97, pp. 103–112.

* cited by examiner

GENERATING A KEY HIEARARCHY FOR USE IN AN ISOLATED EXECUTION ENVIRONMENT

BACKGROUND

1. Field of the Invention

This invention relates to microprocessors. In particular, the invention relates to platform security.

2. Description of Related Art

Advances in microprocessor and communication technologies have opened up many opportunities for applications that go beyond the traditional ways of doing business. Electronic commerce (E-commerce) and business-to-business (B2B) transactions are now becoming popular and are conducted throughout global markets at continuously increasing rates. Unfortunately, while modern microprocessor systems provide users convenient and efficient methods of doing business, communicating and transacting, they are also vulnerable for unscrupulous attacks. Examples of these attacks include virus, intrusion, security breach, and tampering, to name a few. Computer security, therefore, is becoming more and more important to protect the integrity of the computer systems and increase the trust of users.

Threats caused by unscrupulous attacks may be in a number of forms. An invasive remote-launched attack by hackers may disrupt the normal operation of a system connected to thousands or even millions of users. A virus program may corrupt code and/or data of a single-user platform.

Existing techniques to protect against attacks have a number of drawbacks. Anti-virus programs can only scan and detect known viruses. Security co-processors or smart cards using cryptographic or other security techniques have limitations in speed performance, memory capacity, and flexibility. Further, redesigning operating systems creates software compatibility issues and requires tremendous investment in development efforts.

BRIEF DESCRIPTION OF THE DRAWINGS

The features and advantages of the present invention will become apparent from the following detailed description of the present invention in which.

DESCRIPTION

Figure 1A:
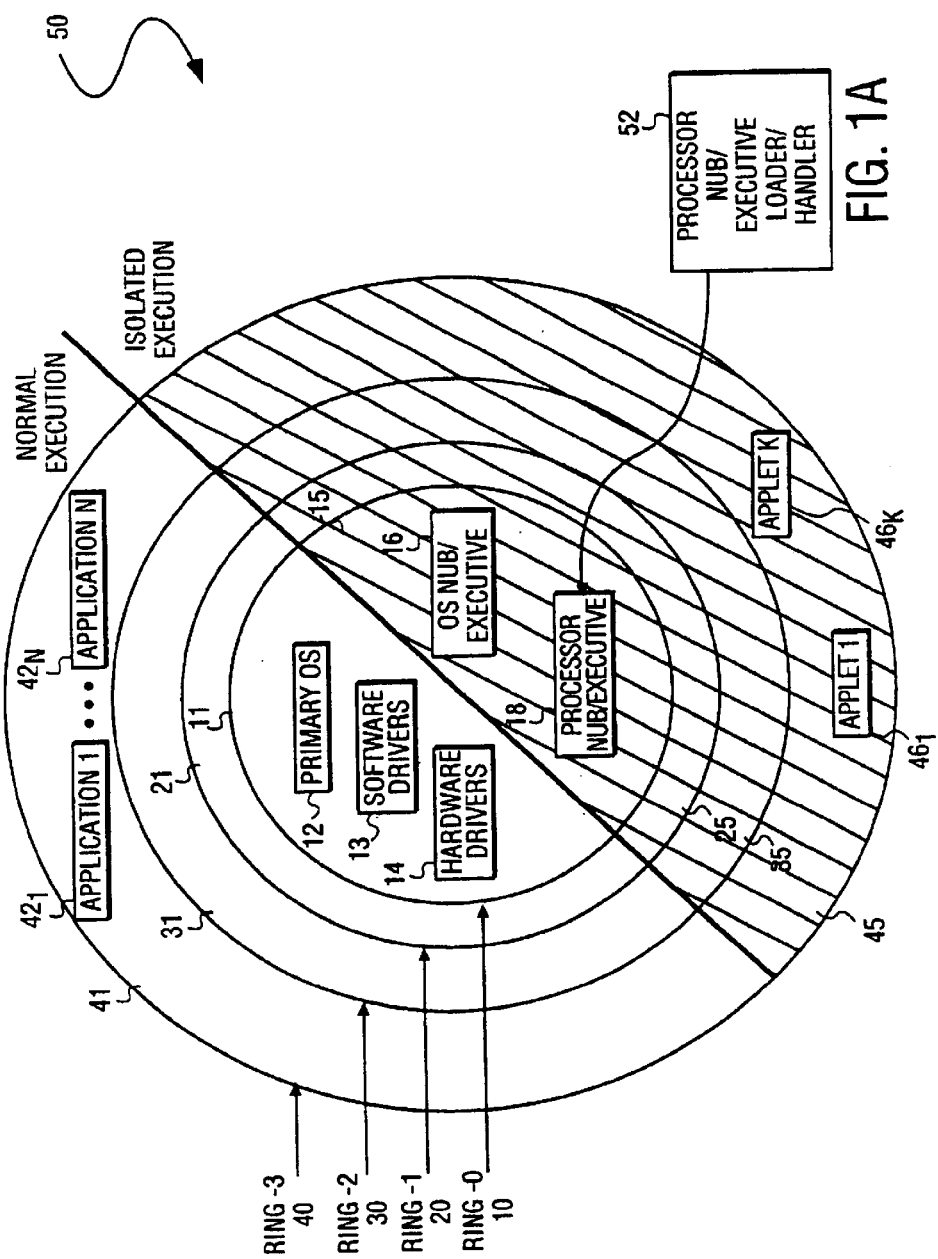
FIG. 1A is a diagram illustrating an operating system according to one embodiment of the invention.

In the following description, terminology is used to discuss certain features of the present invention. For example, a "platform" includes hardware equipment and/or software that perform different functions on stored information. Examples of a platform include, but are not limited or restricted to a computer (e.g., desktop, a laptop, a hand-held, a server, a workstation, etc.), desktop office equipment (e.g., printer, scanner, a facsimile machine, etc.), a wireless telephone handset, a television set-top box, and the like. A "software module" includes code that, when executed, performs a certain function. A "nub" is a series of code instructions, possibly a subset of code from a software module. A "link" is broadly defined as one or more information-carrying mediums (e.g., electrical wire, optical fiber, cable, bus, or wireless signaling technology). In addition, the term "information" is defined as one or more bits of data, address, and/or control. A "hash function" is a function, mathematical or otherwise, that performs a one-way conversion of information to a fixed-length representation. Normally, this representation, referred to as a "hash value" or a "digest", is substantially less in size than the original information.

The present invention is a method, apparatus, and system to generate a key hierarchy for use in an isolated execution environment of a protected platform. In order to bind secrets to particular code operating in isolated execution, a key hierarchy comprising a series of symmetric keys for a standard symmetric cipher is utilized. The protected platform includes a processor that is configured in one of a normal execution mode and an isolated execution mode. A key storage stores an initial key that is unique for the platform. A cipher key creator located in the protected platform creates the hierarchy of keys based upon the initial key. The cipher key creator creates a series of symmetric cipher keys to protect the secrets of loaded software code.

In the following description, for purposes of explanation, numerous details are set forth in order to provide a thorough understanding of the present invention. However, it will be apparent to one skilled in the art that these specific details are not required in order to practice the present invention. In other instances, well-known electrical structures and circuits are shown in block diagram form in order not to obscure the present invention.

Architecture Overview

One principle for providing security in a computer system or platform is the concept of an isolated execution architecture. The isolated execution architecture includes logical and physical definitions of hardware and software components that interact directly or indirectly with an operating system of the computer system or platform. An operating system and the processor may have several levels of hierarchy, referred to as rings, corresponding to various operational modes. A ring is a logical division of hardware and software components that are designed to perform dedicated tasks within the operating system. The division is typically based on the degree or level of privilege, namely, the ability to make changes to the platform. For example, a ring-0 is the innermost ring, being at the highest level of the hierarchy. Ring-0 encompasses the most critical, privilege components. In addition, modules in Ring-0 can also access lesser privileged data, but not vice versa. Ring-3 is the outermost ring, being at the lowest level of the hierarchy. Ring-3 typically encompasses users or applications level and has the least privilege. Ring-1 and ring-2 represent the intermediate rings with decreasing levels of privilege.

FIG. 1A is a diagram illustrating a logical operating architecture 50 according to one embodiment of the invention. The logical operating architecture 50 is an abstraction of the components of an operating system and the processor. The logical operating architecture 50 includes ring-0 10, ring-1 20, ring-2 30, ring-3 40, and a processor nub loader 52. The processor nub loader 52 is an instance of an processor executive (PE) handler. The PE handler is used to handle and/or manage a processor executive (PE) as will be discussed later. The logical operating architecture 50 has two modes of operation: normal execution mode and isolated execution mode. Each ring in the logical operating architecture 50 can operate in both modes. The processor nub loader 52 operates only in the isolated execution mode.

Ring-0 10 includes two portions: a normal execution Ring-0 11 and an isolated execution Ring-0 15. The normal execution Ring-0 11 includes software modules that are critical for the operating system, usually referred to as kernel. These software modules include primary operating system (e.g., kernel) 12, software drivers 13, and hardware drivers 14. The isolated execution Ring-0 15 includes an operating system (OS) nub 16 and a processor nub 18. The OS nub 16 and the processor nub 18 are instances of an OS executive (OSE) and processor executive (PE), respectively. The OSE and the PE are part of executive entities that operate in a protected environment associated with an isolated area and the isolated execution mode. The processor nub loader 52 is a protected bootstrap loader code held within a chipset in the system and is responsible for loading the processor nub 18 from the processor or chipset into an isolated area as will be explained later.

Similarly, ring-1 20, ring-2 30, and ring-3 40 include normal execution ring-1 21, ring-2 31, ring-3 41, and isolated execution ring-1 25, ring-2 35, and ring-3 45, respectively. In particular, normal execution ring-3 includes N applications $42_1$ to $42_N$ and isolated execution ring-3 includes K applets $46_1$ to $46_K$.

One concept of the isolated execution architecture is the creation of an isolated region in the system memory, referred to as an isolated area, which is protected by both the processor and chipset in the computer system. The isolated region may also be in cache memory, protected by a translation look aside buffer (TLB) access check. Also, the isolated region may be subdivided into multiple isolated memory areas, as will be discussed. Access to this isolated region is permitted only from a front side bus (FSB) of the processor, using special bus (e.g., memory read and write) cycles, referred to as isolated read and write cycles. The special bus cycles are also used for snooping. The isolated read and write cycles are issued by the processor executing in an isolated execution mode. The isolated execution mode is initialized using a privileged instruction in the processor, combined with the processor nub loader 52. The processor nub loader 52 verifies and loads a ring-0 nub software module (e.g., processor nub 18) into the isolated area. The processor nub 18 provides hardware-related services for the isolated execution.

One task of the processor nub 18 is to verify and load the ring-0 OS nub 16 into the isolated area, and to generate the root of a key hierarchy unique to a combination of the platform, the processor nub 18, and the operating system nub 16. The processor nub 18 provides the initial set-up and low-level management of the isolated area including verification, loading, and logging of the operating system nub 16, and the management of a symmetric key used to protect the operating system nub's secrets. The processor nub 18 may also provide application programming interface (API) abstractions to low-level security services provided by other hardware.

The operating system nub 16 provides links to services in the primary OS 12 (e.g., the unprotected segments of the operating system), provides page management within the isolated area, and has the responsibility for loading ring-3 application modules 45, including applets $46_1$ to $46_K$, into protected pages allocated in the isolated area. The operating system nub 16 may also load ring-0 supporting modules.

The operating system nub 16 may choose to support paging of data between the isolated area and ordinary (e.g., non-isolated) memory. If so, then the operating system nub 16 is also responsible for encrypting and hashing the isolated area pages before evicting the page to the ordinary memory, and for checking the page contents upon restoration of the page. The isolated mode applets $46_1$ to $46_K$ and their data are tamper-resistant and monitor-resistant from all software attacks from other applets, as well as from non-isolated-space applications (e.g., $42_1$ to $42_N$), dynamic link libraries (DLLs), drivers and even the primary operating system 12. Only the processor nub 18 or the operating system nub 16 can interfere with or monitor the applet's execution.

Figure 1B:
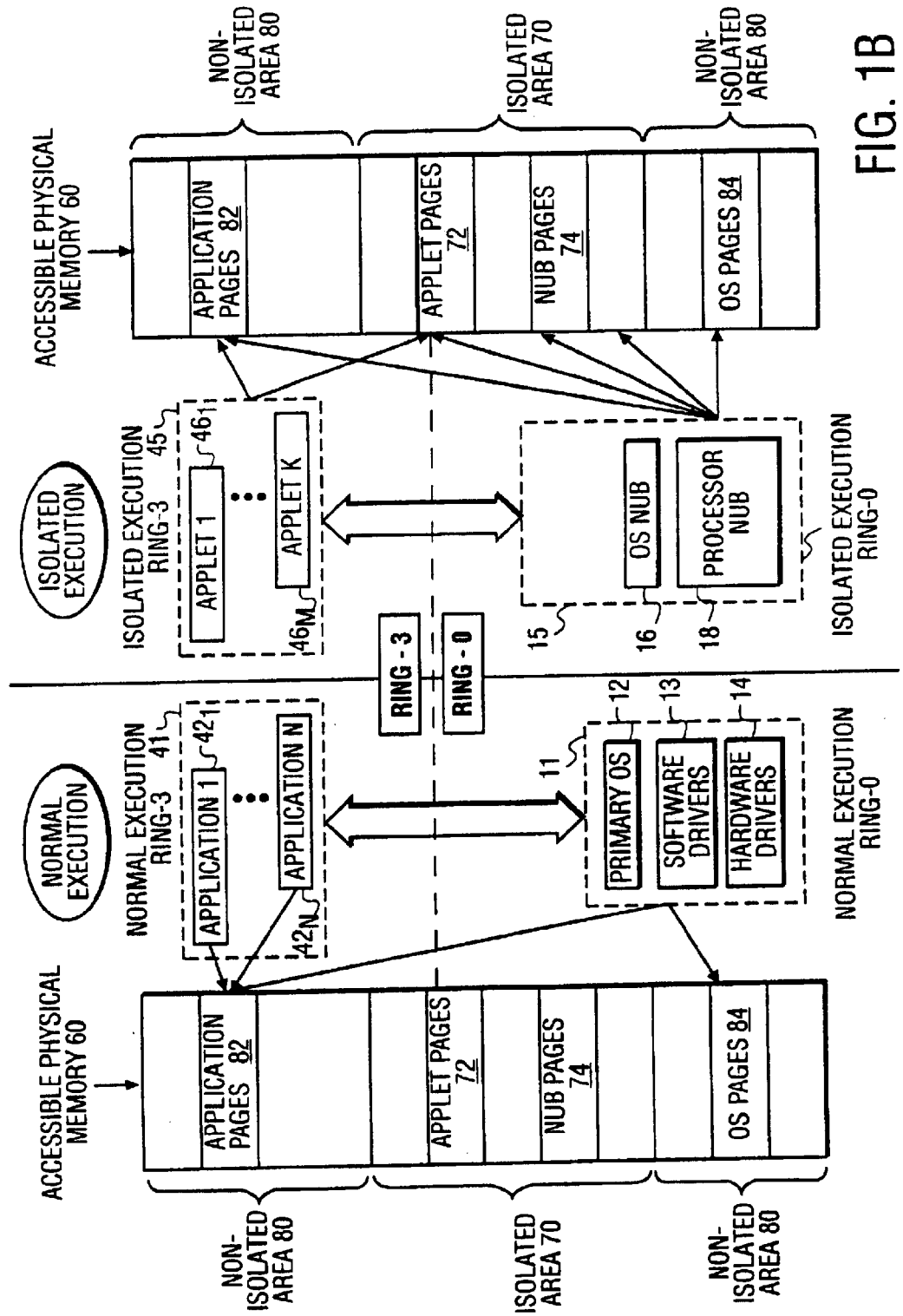
FIG. 1B is a diagram illustrating the accessibility of various elements in the operating system and the processor according to one embodiment of the invention.

FIG. 1B is a diagram illustrating accessibility of various elements in the operating system 10 and the processor according to one embodiment of the invention. For illustration purposes, only elements of ring-0 10 and ring-3 40 are shown. The various elements in the logical operating architecture 50 access an accessible physical memory 60 according to their ring hierarchy and the execution mode.

The accessible physical memory 60 includes an isolated area 70 and a non-isolated area 80. The isolated area 70 includes applet pages 72 and nub pages 74. The non-isolated area 80 includes application pages 82 and operating system pages 84. The isolated area 70 is accessible only to elements of the operating system and processor operating in isolated execution mode. The non-isolated area 80 is accessible to all elements of the ring-0 operating system and processor.

The normal execution ring-0 11 including the primary OS 12, the software drivers 13, and the hardware drivers 14, can access both the OS pages 84 and the application pages 82. The normal execution ring-3, including applications $42_1$ to $42_N$, can access only to the application pages 82. Both the normal execution ring-0 11 and ring-3 41, however, cannot access the isolated area 70.

The isolated execution ring-0 15, including the OS nub 16 and the processor nub 18, can access both the isolated area 70, including the applet pages 72 and the nub pages: 74, and the non-isolated area 80, including the application pages 82 and the OS pages 84. The isolated execution ring-3 45, including applets $46_1$ to $46_K$, can access only to the application pages 82 and the applet pages 72. The applets $46_1$ to $46_K$ reside in the isolated area 70.

Figure 1C:
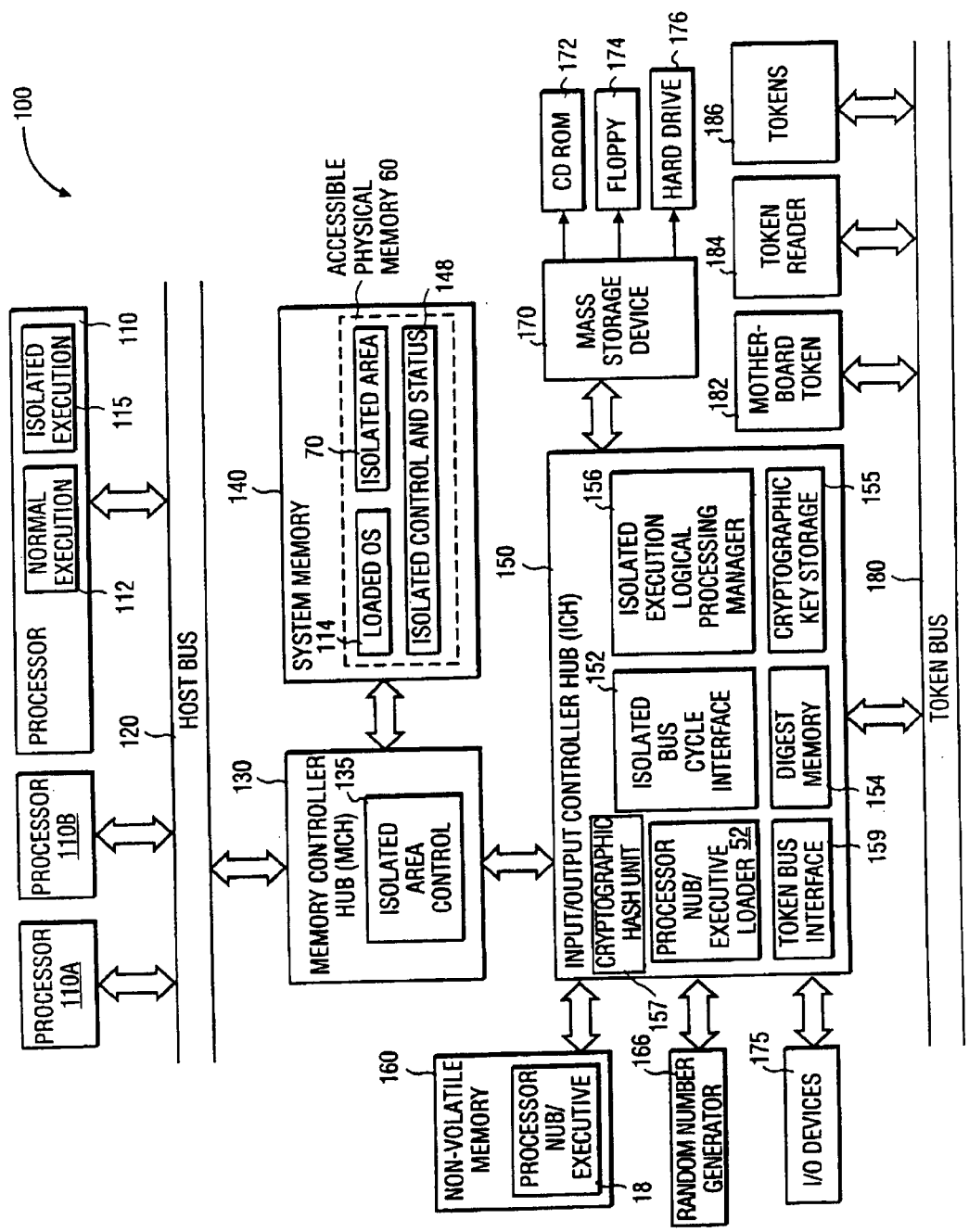
FIG. 1C is a diagram illustrating a computer system in which one embodiment of the invention can be practiced.

FIG. 1C is a diagram illustrating a platform 100 in which one embodiment of the invention can be practiced. The platform 100 includes a processor 110, a host bus 120, a memory controller hub (MCH) 130, a system memory 140, an input/output controller hub (ICH) 150, a non-volatile memory, or system flash, 160, a random number generator 166, a mass storage device 170, input/output devices 175, a token bus 180, a motherboard (MB) token 182, a reader 184, and a token 186. The MCH 130 may be integrated into a chipset that integrates multiple functionalities such as the isolated execution mode, host-to-peripheral bus interface, memory control. Similarly, the ICH 150 may also be integrated into a chipset together or separate from the MCH 130 to perform I/O functions. For clarity, not all the peripheral buses are shown. It is contemplated that the platform 100 may also include peripheral buses such as Peripheral Component Interconnect (PCD), accelerated graphics port (AGP), Industry Standard Architecture (ISA) bus, and Universal Serial Bus (USB), etc.

The processor 110 represents a central processing unit of any type of architecture, such as complex instruction set computers (CISC), reduced instruction set computers (RISC), very long instruction word (VLIW), or hybrid architecture. In one embodiment, the processor 110 is compatible with an Intel Architecture (IA) processor, such as the Pentium™ series, the IA-32™ and the IA-64™. The processor 110 includes a normal execution mode 112 and an isolated execution circuit 115. The normal execution mode 112 is the mode in which the processor 110 operates in a non-protected environment, or a normal environment without the security features provided by the isolated execution mode. The isolated execution circuit 115 provides a mechanism to allow the processor 110 to operate in an isolated execution mode. The isolated execution circuit 115 provides hardware and software support for the isolated execution mode. This support includes configuration for isolated execution, definition of an isolated area, definition (e.g., decoding and execution) of isolated instructions, generation of isolated access bus cycles, and generation of isolated mode interrupts.

In one embodiment, the platform 100 can be a single processor system, such as a desktop computer, which has only one main central processing unit, e.g. processor 110. In other embodiments, the platform 100 can include multiple processors, e.g. processors 110, 110a, 110b, etc., as shown in FIG. 1D. Thus, the platform 100 can be a multi-processor computer system having any number of processors. For example, the multi-processor platform 100 can operate as part of a server or workstation environment. The basic description and operation of processor 110 will be discussed in detail below. It will be appreciated by those skilled in the art that the basic description and operation of processor 110 applies to the other processors 110a and 110b, shown in FIG. 1C, as well as any number of other processors that may be utilized in the multi-processor platform 100 according to one embodiment of the present invention.

The processor 110 may also have multiple logical processors. A logical processor, sometimes referred to as a thread, is a functional unit within a physical processor having an architectural state and physical resources allocated according to some partitioning policy. Within the context of the present invention, the terms "thread" and "logical processor" are used to mean the same thing. A multi-threaded processor is a processor having multiple threads or multiple logical processors. A multi-processor system (e.g., the system comprising the processors 110, 110a, and 110b) may have multiple multi-threaded processors.

The host bus 120 provides interface signals to allow the processor 110 or processors 110, 110a, and 110b to communicate with other processors or devices, e.g., the MCH 130. In addition to normal mode, the host bus 120 provides an isolated access bus mode with corresponding interface signals for memory read and write cycles when the processor 110 is configured in the isolated execution mode. The isolated access bus mode is asserted on memory accesses initiated while the processor 110 is in the isolated execution mode. The isolated access bus mode is also asserted on instruction pre-fetch and cache write-back cycles if the address is within the isolated area address range and the processor 110 is initialized in the isolated execution mode. The processor 110 responds to snoop cycles to a cached address within the isolated area address range if the isolated access bus cycle is asserted and the processor 110 is initialized into the isolated execution mode.

The MCH 130 provides control and configuration of memory and input/output devices such as the system memory 140 and the ICH 150. The MCH 130 provides interface circuits to recognize and service isolated access assertions on memory reference bus cycles, including isolated memory read and write cycles. In addition, the MCH 130 has memory range registers (e.g., base and length registers) to represent the isolated area in the system memory 140. Once configured, the MCH 130 aborts any access to an isolated area that does not have the isolated access bus mode asserted.

The system memory 140 stores system code and data. The system memory 140 is typically implemented with dynamic random access memory (DRAM) or static random access memory (SRAM). The system memory 140 includes the accessible physical memory 60 (shown in FIGS. 1B). The accessible physical memory includes a loaded operating system 142, the isolated area 70 (FIG. 1B), and an isolated control and status space 148. The loaded operating system 142 is the portion of the operating system that is loaded into the system memory 140. The loaded OS 142 is typically loaded from a mass storage device via some boot code in a boot storage such as a boot read only memory (ROM). The isolated area 70 (FIG. 1B) is the memory area that is defined by the processor 110 when operating in the isolated execution mode. Access to the isolated area is restricted and is enforced by the processor 110 and/or the MCH 130 or other chipset that integrates the isolated area functionalities. The isolated control and status space 148 is an input/output (I/O)-like, independent address space defined by the processor 110 and/or the MCH 130. The isolated control and status space 148 contains mainly the isolated execution control and status registers. The isolated control and status space 148 does not overlap any existing address space and is accessed using the isolated bus cycles. The system memory 140 may also include other programs or data which are not shown.

The ICH 150 represents a known single point in the system having the isolated execution functionality. For clarity, only one ICH 150 is shown. The platform 100 may have many ICH's similar to the ICH 150. When there are multiple ICH's, a designated ICH is selected to control the isolated area configuration and status. In one embodiment, this selection is performed by an external strapping pin. As is known by one skilled in the art, other methods of selecting can be used, including using programmable configuring registers. The ICH 150 has a number of functionalities that are designed to support the isolated execution mode in addition to the traditional I/O functions. In particular, the ICH 150 includes an isolated bus cycle interface 152, the processor nub loader 52 (shown in FIG. 1A), a digest memory 154, a cryptographic key storage 155, a cryptographic hash unit 157, an isolated execution logical processing manager 156, and a token bus interface 159.

The isolated bus cycle interface 152 includes circuitry to interface to the isolated bus cycle signals to recognize and service isolated bus cycles, such as the isolated read and write bus cycles.

The processor nub loader 52, as shown in FIG. 1A, includes a processor nub loader code and its digest (e.g., hash) value. The processor nub loader 52 is invoked by execution of an appropriated isolated instruction (e.g., Iso-Init) and is transferred to the isolated area 70. From the isolated area, the processor nub loader 52 copies the processor nub 18 from the system flash (e.g., the processor nub code 18 in non-volatile memory 160) into the isolated area 70, verifies and logs its integrity, and manages a symmetric key used to protect the processor nub's secrets. In one embodiment, the processor nub loader 52 is implemented in read only memory (ROM). For security purposes, the processor nub loader 52 is unchanging, tamper-resistant and non-substitutable.

The digest memory 154 stores the digest (e.g., hash) values of the loaded software modules. In particular we expect the digest memory to store the hash (or the state of the value needed to compute the hash) of an audit log. The audit log contains audit log entries. Each audit log entry includes at least the cryptographic hash of the loaded code—such as the processor nub 18, the operating system (OS) nub 16, and any other critical modules (e.g., ring-0 modules) loaded into the isolated area. In particular the audit log is a listing of data that represents what information has been successfully loaded into the system memory 140 after power-on of the platform 100. For example, the representative data may be hash values of each software module loaded into the system memory 140 during the current power cycle of the platform 100. Thus, the audit log can act as a fingerprint that identifies information loaded into the platform (e.g., the ring-0 code controlling the isolated execution configuration and operation), and is used to attest or prove the state of the current isolated execution.

The cryptographic key storage 155 holds a symmetric encryption/decryption key, e.g. an initial key (to be discussed in more detail later). The initial key is unique for the platform 100. In one embodiment, the initial key is generated by an external hardware random number generator and programmed into the fuses of the of the input/output control hub (ICH) 150 at the time of manufacture. In another embodiment, the initial key is generated by the platform itself, when the platform 100 first powers up, using the internal hardware random number generator 166 of the platform. In both cases, the initial key is stored in the protected non-volatile memory of the cryptographic key storage 155. However, it should be appreciated the initial key could be stored in protected non-volatile memory within other areas of the platform.

The cryptographic hash unit 157 includes logic that performs a one-way hash function on input information. The term "one-way" indicates that there does not readily exist an inverse function to recover any discernible portion of the original information from the fixed-length hash value. Examples of a hash function include MD5 provided by RSA Data Security of Redwood City, Calif., or Secure Hash Algorithm (SHA-1) as specified a 1995 publication Secure Hash Standard FIPS 180-1 entitled "Federal Information Processing Standards Publication" (Apr. 17, 1995). The cryptographic hash unit 157 can be used to perform hashing functions to generate the processor nub keys, the OS nub keys, and the applet keys. These keys will be discussed in more detail later.

The isolated execution logical processing manager 156 manages the operation of logical processors operating in isolated execution mode. In one embodiment, the isolated execution logical processing manager 156 includes a logical processor count register that tracks the number of logical processors participating in the isolated execution mode. The token bus interface 159 interfaces to the token bus 180.

The non-volatile memory 160 stores non-volatile information. Typically, the non-volatile memory 160 is implemented in flash memory. The non-volatile memory 160 includes the processor nub 18.

The processor nub 18 provides the initial set-up and low-level management of the isolated area(s) (in the system memory 140), including verification, loading, and logging of the operating system nub 16, and the management of the symmetric key used to protect the operating system nub's secrets. The processor nub 18 may also provide application programming interface (API) abstractions to low-level security services provided by other hardware. The processor nub 18 may also be distributed by the original equipment manufacturer (OEM) or operating system vendor (OSV) via a boot disk.

The mass storage device 170 stores archive information such as code (e.g., processor nub 18), programs, files, data, applications (e.g., applications $42_1$ to $42_N$), applets (e.g., applets $46_1$ to $46_K$) and operating systems. The mass storage device 170 may include compact disk (CD) ROM 172, floppy diskettes 174, and hard drive 176, and any other magnetic or optic storage devices. The mass storage device 170 provides a mechanism to read machine-readable media.

I/O devices 175 may include any I/O devices to perform I/O functions. Examples of I/O devices 175 include controller for input devices (e.g., keyboard, mouse, trackball, pointing device), media card (e.g., audio, video, graphics), network card, and any other peripheral controllers.

The token bus 180 provides an interface between the ICH 150 and various tokens in the system. A token is a device that performs dedicated input/output functions with security functionalities. A token has characteristics similar to a smart card, including at least one reserved-purpose public/private key pair and the ability to sign data with the private key. Examples of tokens connected to the token bus 180 include a motherboard token 182, a token reader 184, and other portable tokens 186 (e.g., smart card). The token bus interface 159 in the ICH 150 connects through the token bus 180 to the ICH 150 and ensures that when commanded to prove the state of the isolated execution, the corresponding token (e.g., the motherboard token 182, the token 186) signs only valid isolated digest information. For purposes of security, the token should be connected to the digest memory.

When implemented in software, the elements of the present invention are the code segments to perform the necessary tasks. The program or code segments can be stored in a machine readable medium, such as a processor readable medium, or transmitted by a computer data signal embodied in a carrier wave, or a signal modulated by a carrier, over a transmission medium. The "processor readable medium" may include any medium that can store or transfer information. Examples of the processor readable medium include an electronic circuit, a semiconductor memory device, a ROM, a flash memory, an erasable programmable ROM (EPROM), a floppy diskette, a compact disk CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc.

Generating a Key Hierarchy for use in an Isolated Execution Environment

The present invention is a method, apparatus, and system to generate a key hierarchy for use in an isolated execution environment of a protected platform. In order to bind secrets to particular code operating in isolated execution, a key hierarchy comprising a series of symmetric keys for a standard symmetric cipher is utilized.

Figure 2:
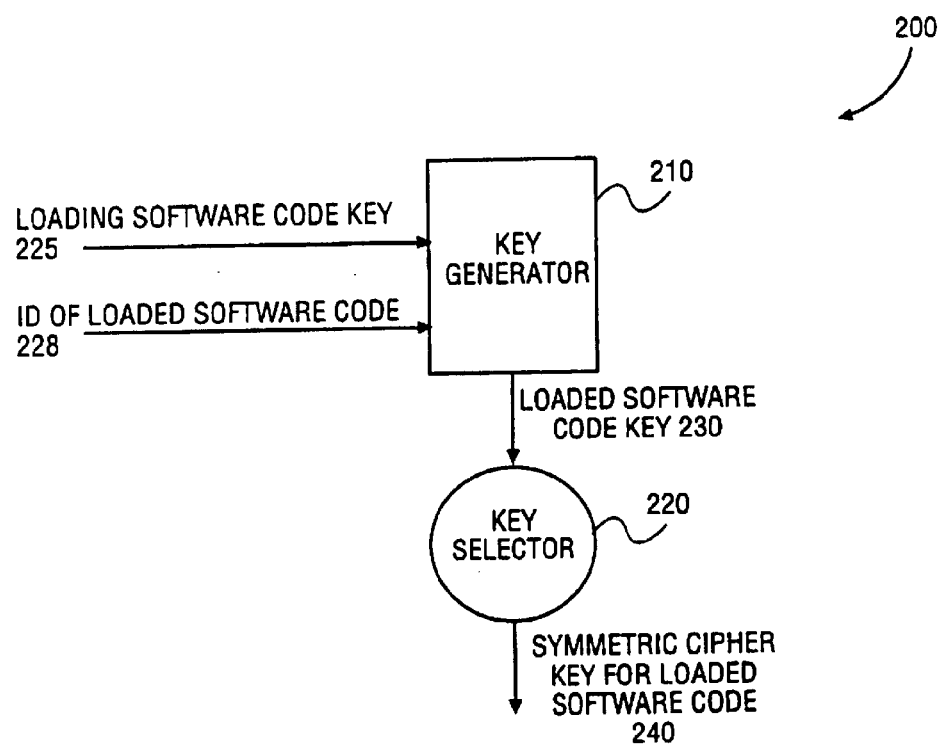
FIG. 2 is a diagram illustrating a cipher key creator according to one embodiment of the invention.

FIG. 2 is a diagram illustrating a cipher key creator 200 according to one embodiment of the invention. The cipher key creator includes a key generator 210 and a key selector 220. Software code that is currently active in the isolated execution environment (i.e. already loaded in the isolated memory area) has a loading software code key 225 associated with it. The loading software code that is currently active is used to load subsequent software code. Software code that is being subsequently loaded into the isolated execution environment has an ID value associated with it, denoted, ID of loaded software code 228. The ID 228 can be the hash of the loaded software code. However, it might also be an approved ID of the loaded software code.

In the embodiment where the ID 228 is an approved ID of the loaded software code, the ID 228 can be communicated to the active loading software code by way of a certificate that is verified against a certificate verification root key held inside the active loading software code. In one embodiment, the certificate consists of the certificate contents and a digital signature on the certificate contents. The certificate contents may consist of at least the hash of the loaded software code and the ID 228 value. One example of a certificate that could be used is an SPKI authorization certificate (see IETF RFC 2693, Internet Engineering Task Force Request for Comments 2693, "SPK1 Certificate Theory," Ellison et. al., September 1999). However, it should be appreciated by those skilled in the art, that a wide variety of different certificate formats could be used.

The loading software code key 225 and the ID of the loaded software code 228 are provided as inputs to the key generator 210. The key generator 210 generates a loaded software code key 230 for the loaded software code. The key generator 210 generates the loaded software code key 230 utilizing a function that has the characteristics of a cryptographic hash. Thus, in one embodiment, a hashing function can be employed by the key generator 210. The key generator hashes the loading software code key 225 and the ID of loaded software code 228 to generate the loaded software code key 230. For example, an HMAC based on SHA-1 may be used (see IETF RFC 2104, Internet Engineering Task Force Request for Comments 2104, "HMAC: Keyed-Hashing for Message Authentication," Krawcyzk et. al., February 1997). However, it should be appreciated that other generally acceptable cryptographic hash functions may be used as well. Further, in one embodiment, the cryptographic hash unit 157 (FIG. 1C) can be used to perform the hashing function. Also, it should be appreciated that a wide variety of other types of one-way functions can be used to generate the loaded software code key 230.

Generally, the loaded software code key 230 will be the size of a hash function output value, but it could be any size provided it has at least enough bits to be cryptographically secure. However, the loaded software code key 230 for the loaded software code may not be small enough for use in a desirable symmetric cipher, such as triple-DES (Data Encryption Standard) or AES (the new Advanced Encryption Standard being chosen by the NIST (National Institute of Standards and Technology)). Therefore, the key selector 220 applies a key selection function to select a key of the proper size (e.g., 112, 168, 128 or 256 bits) from the larger loaded software code key 230 to produce a symmetric cipher key 240 for the loaded software code.

The key generator 210 performs a generation function, denoted $G( )$, to generate a second key (denoted K2) from a first key (denoted K1) and an ID. The equation takes the form $K2=G(ID, K1)$. In one embodiment, the second key K2 that is generated is the loaded software code key 230. Thus, the equation $K2=G(ID, K1)$, generates the loaded software code key 230 utilizing the $G( )$ function, where the ID is the ID of the loaded software code 228 and K1 is the loading software code key 225. As previously discussed, the generation function, $G( )$, may be a cryptographic hashing function. The $G( )$ function is referenced throughout the rest of the patent to describe the generation of keys such as the processor nub key, the OS nub key, and applet keys, which will be discussed in detail later.

The key selector 220 performs a key selection function $S( )$ to generate a third key (denoted K3) from the second key K2. The equation takes the form $K3=S(K2)$. The key selection function $S( )$ generates K3 such that K3 is a small enough symmetric cipher key that in can be used in a desired symmetric cipher. In one embodiment, the third key K3 that is generated is the symmetric cipher key 240 for the loaded software code. As previously discussed, the key selector 220 applies the key selection function $S( )$ to select a symmetric cipher key 240 (K3) of the proper size (e.g., 112, 168, 128 or 256 bits) from the larger loaded software code key 230 to produce the symmetric cipher key 240 for the loaded software code. The $S( )$ function is referenced throughout the rest of the patent to describe the selection of cipher keys such as the processor nub cipher key, the OS nub cipher key, and applet cipher keys, which will be discussed in detail later.

Every loaded software module that is currently in control of the isolated execution environment will therefore have at least two keys, the loaded software code key 230 and the symmetric cipher key 240 for the loaded software code. If multiple encryption algorithms are employed by the software module, the software module might have multiple symmetric cipher keys similar in form to the symmetric cipher key 240. In the case where there is only one key to be selected from the loaded software code key 230, that selection can use the exclusive OR of one or more disjoint segments of the longer key where those segments are the length of the desired key. In case there are multiple cryptographic keys to be generated, a function like an HMAC could be used for $S( )$, using as a key, a large randomly generated value that is specific to the algorithm for which the key is being generated.

The Hierarchy of Keys

Figure 3:
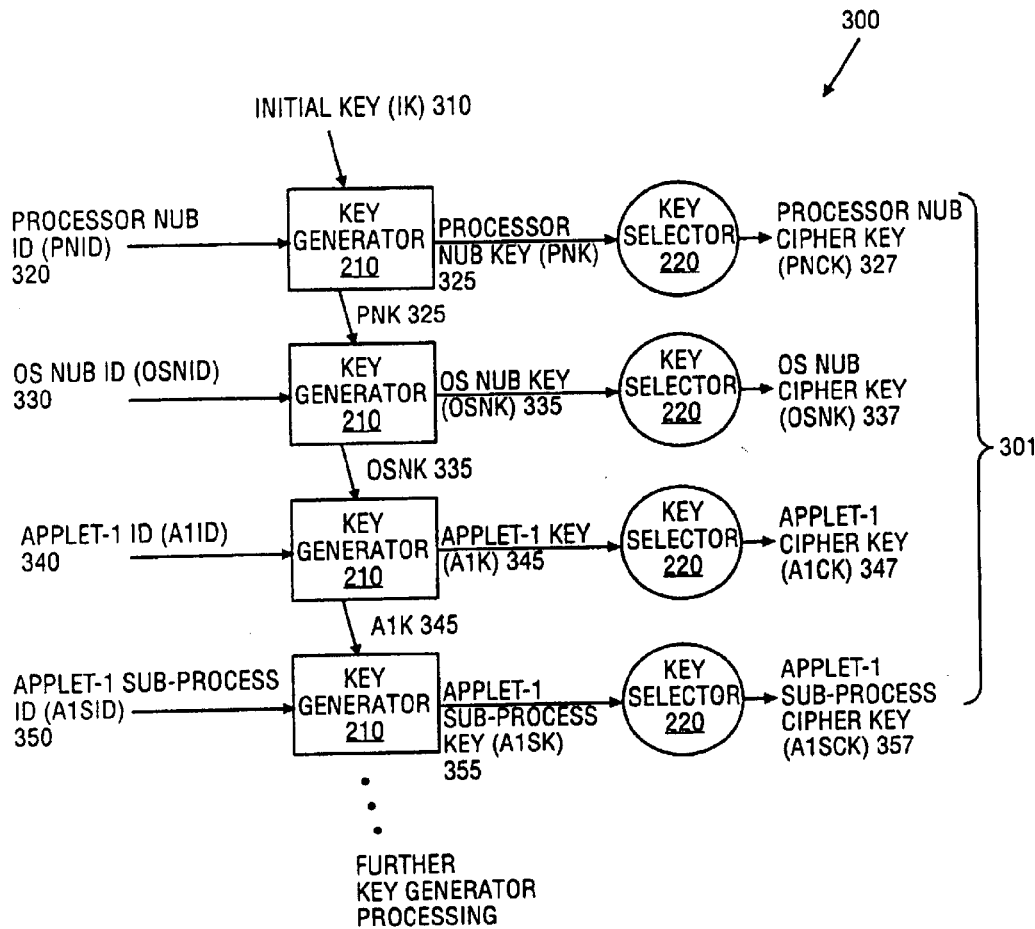
FIG. 3 is a diagram illustrating a process for generating a key hierarchy according to one embodiment of the invention.

FIG. 3 is a diagram illustrating a process 300 for generating a key hierarchy 301 according to one embodiment of the invention. The process 300 generates the key hierarchy 301, which includes a plurality of symmetric keys generated by the cipher key creator 200, as previously discussed. The keys are utilized to bind secrets to particular code operating in isolated execution.

The isolated execution area (e.g. isolated execution ring-0 15 and isolated execution ring-3 45 shown in FIGS. 1A and 1B) is populated in layers. Particularly relevant to isolated execution and the following discussion are the processor nub 18, the OS nub 16, and applets 46 (previously discussed in depth with reference to FIGS. 1A and 1B of the Architecture Overview of the patent). First the processor nub 18 is loaded and takes control of the isolated execution environment. The process 300 first generates a processor nub key (PNK) 325 with the key generator 210. The key generator 210 uses the Initial Key (IK) 310 and the processor nub ID (PNID) 320 as inputs. The key generator 210 performs a generation function as follows: $PNK=G(IK, PNID)$—where IK 310 is the initial key, specific to the platform, and the PNID 320 is the ID of the processor nub. As previously discussed, the generation function, $G( )$, may be a cryptographic hashing function. The ID can be the hash of the code itself or some certified ID value, as discussed above. However, if it is a certified value, the processor nub loader must be able to validate the certificate holding that ID value.

Next, the process 300 generates a processor nub cipher key (PNCK) 327 utilizing the key selector 220. The key selector 220 performs a key selection function as follows: PNCK=S(PNK)—where PNK 325 is the processor nub key. As previously discussed, the key selection function S( ) generates a cipher key that is a small enough that it can be used in a desired symmetric cipher. For example, the key selector 220 applies the key selection function S( ) to select a symmetric key, PNCK 327, of the proper size (e.g., 112, 168, 128 or 256 bits) from the PNK 325. The processor-nub 18 uses the PNCK 327 to protect its secrets from the OS nub 16, applets 46, and non-isolated execution code.

In one embodiment, the initial key (IK) 310 is generated by an external hardware random number generator and programmed into fuses of the of the input/output control hub (ICH) 150 (FIG. 1C) at the time of manufacture. In another embodiment, the IK 310 is generated by the platform 100 itself, when the platform first powers up using the internal hardware random number generator 166 (FIG. 1C) of the platform, and is then stored in the non-volatile memory of the cryptographic key storage 155 within the ICH 150 (FIG. 1C). This embodiment reduces the chance of the IK 310 being compromised during manufacture. In both cases, the IK 310 is stored in the protected non-volatile memory of the cryptographic key storage 155. However, it should be appreciated the IK 310 could be stored in protected non-volatile memory within other areas of the platform.

As other software modules (e.g. the OS nub 16, applets 46, etc.) are loaded into the Isolated Execution area, the keys of the newly loaded module replace the keys of the loading module. However, the IK 310 is not replaced, but is made inaccessible by the setting of a hardware settable flag that prevents the location from being read. That flag is cleared only by the total re-initialization of the isolated area. Generated keys are overwritten and therefore become unavailable.

When the processor nub 18 is first loaded, the process 300 causes the processor nub key (PNK) 325 and processor nub cipher key (PNCK) 327 to be generated, as previously discussed. If the processor nub needs to store any secrets to be accessed only by it, it can use PNCK 327 as the cryptographic key for that purpose. When the processor nub decides to load the OS nub 16 and transfer control to it, the OS nub key (OSNK) 335 and the OS nub cipher key (OSNCK) 337 are generated, utilizing the same process 300, as previously described to generate the PNK 325 and the PNCK 327. Further, the OSNK 335 and the OSNCK 337 replace the PNK 325 and PNCK 327 in the cryptographic key storage. The OSNCK 337 is used by the OS nub to protect its secrets form other OS nubs, applets, and non-isolated execution code. Now, if there are any secrets to be made available for future uses by the OS Nub, they can be encrypted by the OSNCK 337. However, any secrets encrypted under PNCK 327 are not available to the OS nub or any other software to be loaded on this platform.

This process 300 may be successively repeated, for any and all layers of software code loading. FIG. 3 shows four layers for: the processor nub, the OS nub, Applet-1, and Applet-1 sub-process. The process 300 generates the Applet-1 key (A1K) 345 and the Applet-1 cipher key (A1CK) 347 for Applet-1 and the Applet-1 sub-process key (A1SK) 355 and the Applet-1 sub-process cipher key (A1SCK) 357 for an Applet-1 subprocess utilizing the same process 300, as previously described to generate the processor nub and OS nub keys. It should be appreciated that the key hierarchy 301 and the process 300 are only exemplary, and that other key hierarchies, as well as processes for creating these key hierarchies, are possible for protecting secrets in an isolated execution environment.

Another Embodiment for the Back-up and Restoration of Data

Figure 4:
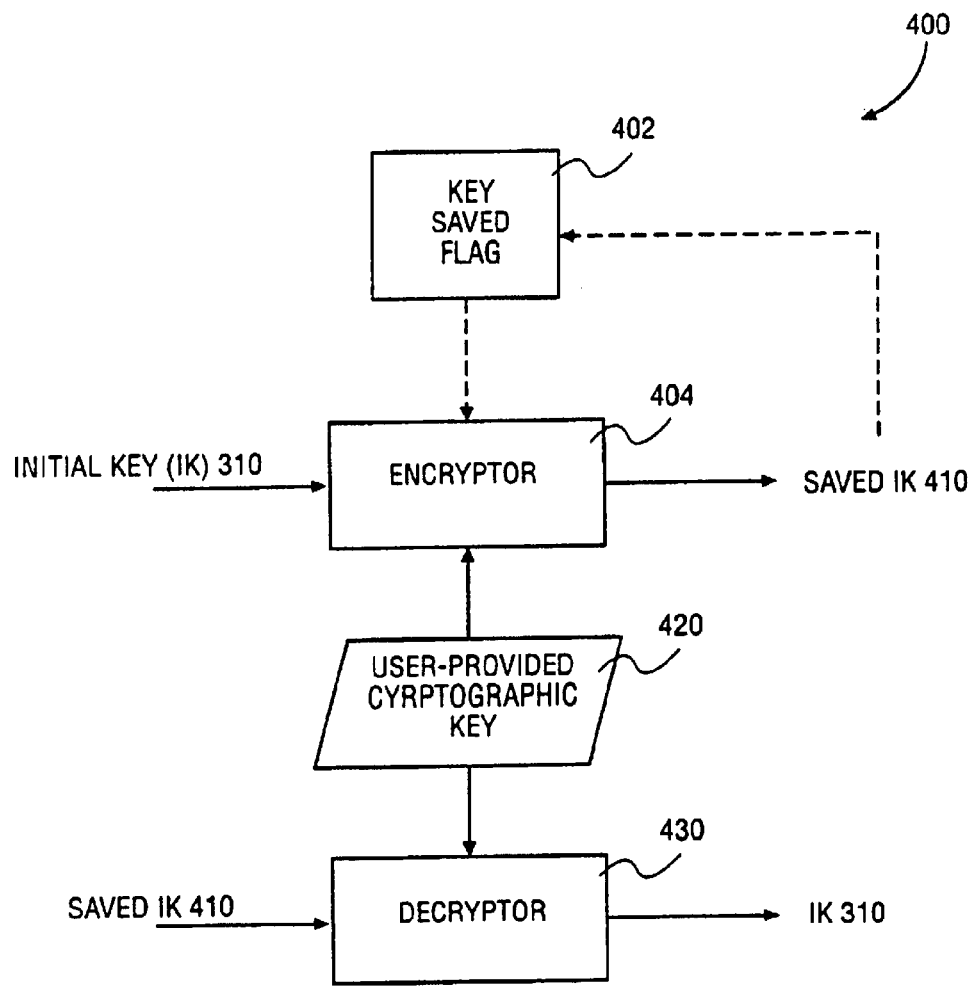
FIG. 4 is a diagram illustrating a system for saving an initial key to allow for the back-up and restoration of data according to one embodiment of the invention.

FIG. 4 is a diagram illustrating a system 400 for saving an initial key to allow for the back-up and restoration of data according to one embodiment of the invention.

As described above, the initial key (IK) 310 is unique for each platform and is locked into that platform, (i.e. it is permanently stored in the protected non-volatile memory of the cryptographic key storage 155 (FIG.1C)). Unfortunately, in this embodiment, there is no way to back up or restore the IK 310. Another embodiment of the invention permits the IK 310 to be backed-up and restored, as shown in FIG. 4. This is desirable for a user who binds valuable secrets into the platform and then wants to upgrade his or her hardware at some future time. The upgrade could happen because the platform owner has decided to use newer, faster hardware. Alternatively, the upgrade could happen because the platform suddenly and catastrophically fails and needs to be replaced.

Under this embodiment, there is a key saved flag 402 in non-volatile memory that is cleared whenever a new initial key (IK) 310 is generated (not when it is restored). As long as that flag is cleared, the encryptor 404 is allowed to encrypt the IK 310. The encryptor 404 performs an encryption function to encrypt the IK 310 using a cryptographic key 420 provided by the user (presumably the platform owner). The encrypted result is the saved IK 410. The saved IK 410 is allowed to be read by anyone. In particular, the saved IK 410 is allowed to be backed up by normal backup utilities. When the saved IK 410 is generated, the key saved flag 402 is set, prohibiting any future saving of the IK 310.

At any time in the future, the user is able to provide the appropriate cryptographic key 420 and an earlier saved IK 410 to a decryptor 430 that performs a decryption function to overwrite the IK 310. This allows a platform owner to replace a failed platform including all the secrets that were bound into the isolated area of the platform. The encryption and decryption functions of the encryptor 404 and the decryptor 430, respectively, can be generally acceptable symmetric cryptographic functions, such as triple-DES (Data Encryption Standard) or AES (the new Advanced Encryption Standard being chosen by the NIST (National Institute of Standards and Technology)).

Figure 5:
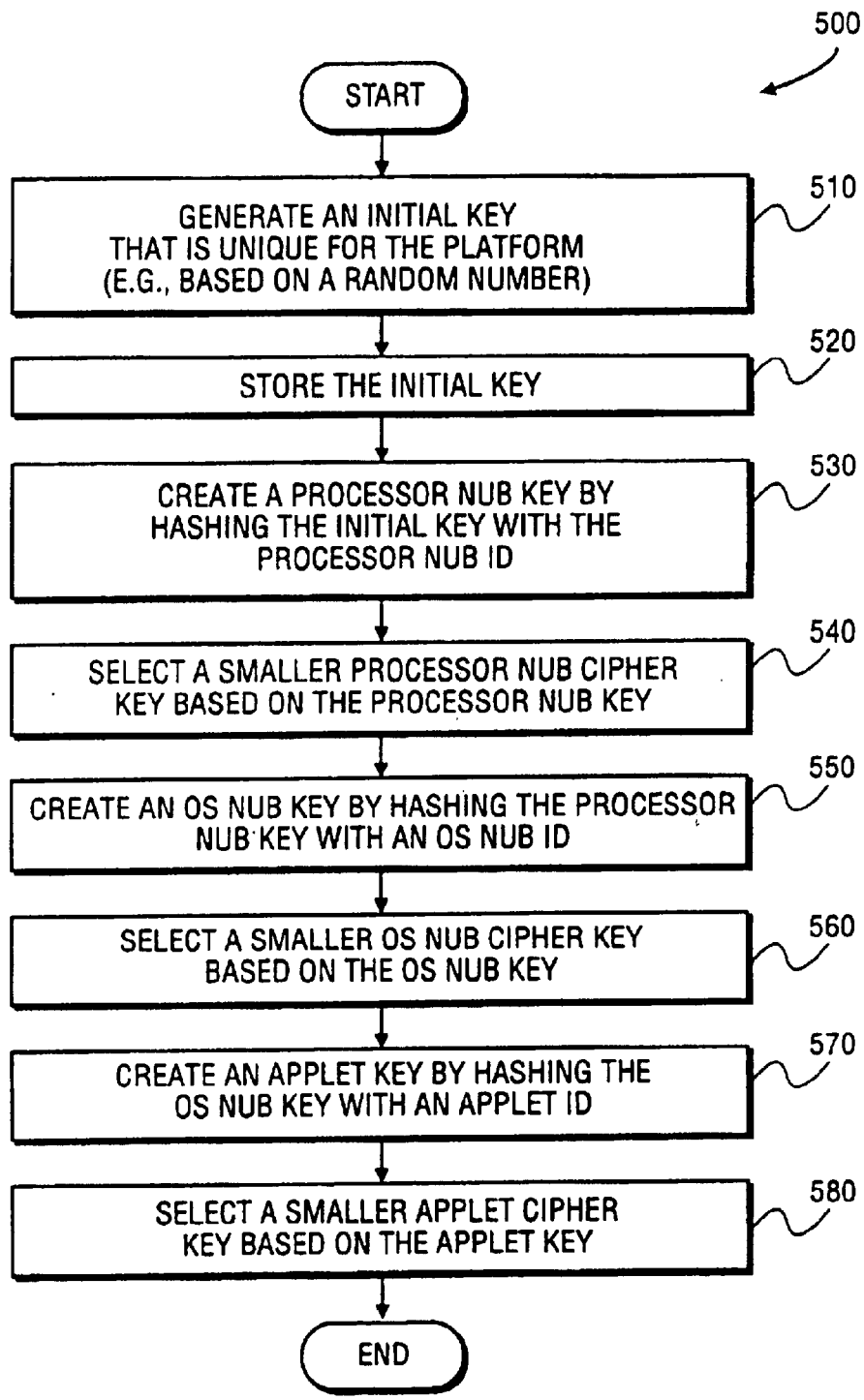
FIG. 5 is a flowchart further illustrating the process to generate a key hierarchy according to one embodiment of the invention.

FIG. 5 is a flowchart further illustrating the process to generate a key hierarchy according to one embodiment of the invention.

Upon START, the process 500 generates an initial key that is unique for the platform (e.g. based on a random number) (block 510). Then, the process 500 stores the initial key (block 520). Next, the process 500 creates a processor nub key by hashing the initial key with the ID of the processor nub (block 530). The process 500 then selects a smaller processor nub cipher key based on the processor nub key (block 540). In block 550, the process 500 creates an OS nub key by hashing the processor nub key with the ID of the OS Nub. Then, the process 500 selects a smaller OS nub cipher key based on the OS nub key (block 560). Next, the process 500 creates an applet key by hashing the OS nub key with the ID of the applet (block 570). In block 580, the process 500 selects a smaller applet cipher key based on the applet key. The process 500 is then terminated.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. An apparatus comprising:
   a key storage for storing an initial key unique to a platform; and
   a cipher key creator in a protected platform creating a hierarchy of keys based upon the initial key, the protected platform having a processor configured in one of a normal execution mode and an isolated execution mode, the cipher key creator including a key generator for hashing an ID of loaded software code with a loading software code key to create a loaded software code key and a key selector for selecting a smaller symmetric cipher key from the loaded software code key.

2. The apparatus of claim 1 wherein the initial key is programmed into fuses of an Input/Output Control Hub (ICH).

3. The apparatus of claim 1 wherein the initial key is based on a random number.

4. The apparatus of claim 1 wherein the initial key is generated by the platform when the platform is first powered up.

5. The apparatus of claim 4 wherein the initial key is based upon a random number created by a random number generator of the platform.

6. The apparatus of claim 1 wherein the key generator creates a processor nub key by hashing the initial key with a processor nub ID and the key selector selects a smaller processor nub cipher key based on the processor nub key.

7. The apparatus of claim 6 wherein the key generator creates an OS nub key by hashing the processor nub key with an OS nub ID and the key selector selects a smaller OS nub cipher key based on the OS nub key.

8. The apparatus of claim 7 wherein the key generator creates an applet key by hashing the OS nub key with an applet ID and the key selector selects an applet cipher key based on the applet key.

9. A method comprising:
   storing an initial key unique to a platform;
   creating a hierarchy of keys based upon the initial key in a protected platform, the protected platform having a processor configured in one of a normal execution mode and an isolated execution mode;
   hashing an ID of loaded software code with a loading software code key to create a loaded software code key; and
   selecting a smaller symmetric cipher key from the loaded software code key.

10. The method of claim 9 wherein storing the initial key comprises programming the initial key into fuses of an Input/Output Control Hub (ICH).

11. The method of claim 9 wherein the initial key is based on a random number.

12. The method of claim 9 further comprising generating the initial key utilizing the platform when the platform is first powered up.

13. The method of claim 12 wherein generating the initial key comprises:
   creating a random number with a random number generator of the platform;
   generating the initial key based upon the random number; and
   storing the initial key in the key storage.

14. The method of claim 9 further comprising:
   creating a processor nub key by hashing the initial key with a processor nub ID; and
   selecting a smaller processor nub cipher key based on the processor nub key.

15. The method of claim 14 further comprising:
   creating an OS nub key by hashing the processor nub key with an OS nub ID; and
   selecting a smaller OS nub cipher key based on the OS nub key.

16. The method of claim 15 further comprising creating an applet key by hashing the OS nub key with an applet ID; and
   selecting an applet cipher key based on the applet key.

17. A computer program product comprising:
   a machine readable medium having program code embedded therein, the computer program product comprising:
      computer readable program code for storing an initial key unique to a platform;
      computer readable program code for creating a hierarchy of keys based upon the initial key in a protected platform, the protected platform having a processor configured in one of a normal execution mode and an isolated execution mode;
      computer readable program code for hashing an ID of loaded software code with a loading software code key to create a loaded software code key; and
      computer readable program code for selecting a smaller symmetric cipher key from the loaded software code key.

18. The computer program product of claim 17 wherein the computer readable program code for storing an initial key comprises computer readable program code for programming the initial key into fuses of an Input/Output Control Hub (ICH).

19. The computer program product of claim 17 wherein the initial key is based on a random number.

20. The computer program product of claim 17 further comprising computer readable program code for generating the initial key utilizing the platform when the platform is first powered up.

21. The computer program product of claim 20 wherein the computer readable program code for generating the initial key comprises:
   computer readable program code for creating a random number with a random number generator of the platform;
   computer readable program code for generating the initial key based upon the random number; and
   computer readable program code for storing the initial key in the key storage.

22. The computer program product of claim 17 further comprising:
   computer readable program code for creating a processor nub key by hashing the initial key with a processor nub ID; and
   computer readable program code for selecting a smaller processor nub cipher key based on the processor nub key.

23. The computer program product of claim 22 further comprising:
   computer readable program code for creating an OS nub key by hashing the processor nub key with an OS nub ID; and computer readable program code for selecting a smaller OS nub cipher key based on the OS nub key.

24. The computer program product of claim 23 further comprising:

computer readable program code for creating an applet key by hashing the OS nub key with an applet ID; and computer readable program code for selecting an applet cipher key based on the applet key.

25. A protected platform comprising:

a chipset;

a memory coupled to the chipset having an isolated memory area;

a processor coupled to the chipset and the memory, the processor having a normal execution mode and an isolated execution mode, processor accessing the isolated memory area when the processor is in the isolated execution mode;

a key storage for storing an initial key unique to a platform; and a cipher key creator creating a hierarchy of keys based upon the initial key, the cipher key creator including a key generator for hashing an ID of loaded software code with a loading software code key to create a loaded software code key and a key selector for selecting a smaller symmetric cipher key from the loaded software code key.

26. The protected platform of claim 25 wherein the initial key is programmed into fuses of an Input/Output Control Hub (ICH).

27. The protected platform of claim 25 wherein the initial key is based on a random number.

28. The protected platform of claim 25 wherein the initial key is generated by the platform when the platform is first powered up.

29. The protected platform of claim 28 wherein the initial key is based upon a random number created by a random number generator of the platform.

30. The protected platform of claim 25 wherein the key generator creates a processor nub key by hashing the initial key with a processor nub ID and the key selector selects a smaller processor nub cipher key based on the processor nub key.

31. The protected platform of claim 30 wherein the key generator creates an OS nub key by hashing the processor nub key with an OS nub ID and the key selector selects a smaller OS nub cipher key based on the OS nub key.

32. The protected platform of claim 31 wherein the key generator creates an applet key by hashing the OS nub key with an applet ID and the key selector selects an applet cipher key based on the applet key.

* * * * *

UNITED STATES PATENT AND TRADEMARK OFFICE
CERTIFICATE OF CORRECTION

PATENT NO. : 6,760,441 B1
DATED : July 6, 2004
INVENTOR(S) : Ellison et al.

It is certified that error appears in the above-identified patent and that said Letters Patent is hereby corrected as shown below:

Column 5,
Line 1, delete "PCD" and insert -- PCI --.

Column 12,
Line 58, delete "SOO" and insert -- 500 --.

Signed and Sealed this

Seventh Day of September, 2004

JON W. DUDAS
*Director of the United States Patent and Trademark Office*